United States Patent
Sadovoy et al.

(10) Patent No.: US 11,592,281 B2
(45) Date of Patent: Feb. 28, 2023

(54) PREDETERMINING THE THICKNESS OF A COATING

(71) Applicant: Siemens Energy Global GmbH & Co. KG, Munich (DE)

(72) Inventors: Alexandr Sadovoy, Berlin (DE); Martin Witzel, Birkenwerder (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 15/753,613

(22) PCT Filed: Jul. 21, 2016

(86) PCT No.: PCT/EP2016/067385
§ 371 (c)(1),
(2) Date: Feb. 20, 2018

(87) PCT Pub. No.: WO2017/032518
PCT Pub. Date: Mar. 2, 2017

(65) Prior Publication Data
US 2018/0238679 A1 Aug. 23, 2018

(30) Foreign Application Priority Data
Aug. 24, 2015 (DE) .......................... 102015216096.3

(51) Int. Cl.
*C23C 4/12* (2016.01)
*G01B 11/06* (2006.01)
(Continued)

(52) U.S. Cl.
CPC .......... *G01B 11/0616* (2013.01); *B05B 7/166* (2013.01); *B05B 7/22* (2013.01); *B05B 12/084* (2013.01); *C23C 4/073* (2016.01); *C23C 4/10* (2013.01); *C23C 4/12* (2013.01); *C23C 4/129* (2016.01); *C23C 4/134* (2016.01);
(Continued)

(58) Field of Classification Search
CPC .......... C23C 4/10; C23C 4/073; C23C 4/129; C23C 4/134; C23C 4/12; C23C 24/04; G01B 21/08; G01B 11/0683; G01B 11/0616; G01B 5/066; B05B 12/084; B05B 7/166; B05B 7/22
See application file for complete search history.

(56) References Cited

U.S. PATENT DOCUMENTS

| | | | |
|---|---|---|---|
| 5,183,508 A | 2/1993 | Cholinski | |
| 2006/0246213 A1* | 11/2006 | Moreau | C23C 4/12 427/8 |
| 2012/0269958 A1* | 10/2012 | Subramanian | C23C 4/12 427/9 |

FOREIGN PATENT DOCUMENTS

EP 2860277 A1 4/2015

OTHER PUBLICATIONS

PCT International Search Report for PCT International Application No. PCT/EP2016/067385, dated Oct. 18, 2016.

\* cited by examiner

*Primary Examiner* — Katherine A Bareford
(74) *Attorney, Agent, or Firm* — Schmeiser, Olsen & Watts LLP

(57) ABSTRACT

A method for predetermining a thickness of a coating which is to be arranged on a substrate is provided. A spray spot is arranged on a surface of the substrate or a test substrate. The volume of the spray spot is determined, and based on the determined volume, the thickness of a layer which is to be applied is worked out. An arrangement for predetermining the thickness of a coating is further provided.

7 Claims, 2 Drawing Sheets

(51) Int. Cl.
- *G01B 21/08* (2006.01)
- *C23C 4/134* (2016.01)
- *C23C 4/073* (2016.01)
- *C23C 4/129* (2016.01)
- *C23C 4/10* (2016.01)
- *B05B 12/08* (2006.01)
- *B05B 7/16* (2006.01)
- *B05B 7/22* (2006.01)
- *G01B 5/06* (2006.01)

(52) U.S. Cl.
CPC .......... *G01B 5/066* (2013.01); *G01B 11/0683* (2013.01); *G01B 21/08* (2013.01)

PREDETERMINING THE THICKNESS OF A COATING

CROSS-REFERENCE TO RELATED APPLICATIONS

This application claims priority to PCT Application No. PCT/EP2016/067385, having a filing date of Jul. 21, 2016, based off of German application No. DE 102015216096.3 having a filing date of Aug. 24, 2015, the entire contents of both of which are hereby incorporated by reference.

FIELD OF TECHNOLOGY

The following relates to a method for predetermining the thickness of a complete coating which is to be arranged on a substrate, on the basis of the volume of a spray spot.

BACKGROUND

Thermal barrier coatings for gas turbine components require strict control of the properties of the coating in order to ensure the necessary protection. One of the most important properties is the thickness of the coating. In that context, the nominal thickness must be achieved both in the development of the coating and of the coating method and also during application of the coating under mass production conditions.

Coatings are often applied by even movement of an application device in parallel tracks over the substrate, for example by spraying using a spray gun. A spray pattern corresponding to the movement of the spray gun is formed on the substrate. A region of a coating produced by coating using a static spray gun is referred to as a spray spot. A spray spot can thus be understood as a region of a coating material formed within a certain time span at one location on the substrate at the beginning of coating by spraying. The movement of the spray gun along a predefined raster pattern on the substrate produces a complete coating. In order to determine the thickness of the coating, test coatings are applied to test substrates. This testing varies, inter alia, the number of applied layers, the speed of the arrangement and the distance between the tracks that the arrangement follows over the substrate. It is also possible to vary parameters such as the type of process gas, the voltage and the current of the arrangement, the rates of deposited material and others, in order to achieve a desired thickness of the coating. After application, the thickness of the coating can be determined by destructive (e.g. metallographic) or non-destructive (e.g. 3-D scanning or eddy current measurement) means. The drawback of this method is that it is necessary to apply a complete coating to the test substrate, which is time-consuming and material-intensive, and therefore uneconomical.

An alternative possibility is to simulate the thickness of a coating (US 2012269958). However, this method requires complex software. It is also necessary to have a reliable method model in order to quantify the method parameters.

SUMMARY

Embodiments of the present invention relate to a method with which it is possible to determine the thickness of a substrate coating reliably and economically in advance.

A first aspect of embodiments of the invention relates to a method for determining the thickness of a coating which is applied to a substrate, comprising the following steps:

S1) preparing a substrate,
S2) providing a device for arranging a coating,
S3) arranging a coating material,
S4) determining the volume of an applied spray spot applied in a fixed time span,
S5) calculating the thickness of a layer that is to be applied, on the basis of the determined volume of the spray spot, wherein the layer thickness is determined by the equation $$h_{layer} = 1/(v \ast p) \ast \Delta V_{spot}/\Delta t$$

where $h_{layer}$ is the layer thickness, v is the speed of the device for arranging a coating, p is the track offset, $\Delta V_{spot}$ is the determined volume of the spray spot produced during a spray time $\Delta t$.

The method is advantageous because the thickness of a coating can be determined on the basis of the sprayed-on volume of a spray spot, which is relatively simple and cost-effective to determine since calculating the coating thickness does not require the application of complete coatings or the use of complicated software.

Preferably, the coating is applied to a test substrate. This advantageously allows parameters of the application of the coating to be tested and optimized for a certain layer thickness.

It is also preferred if the coating is applied to the substrate of a gas turbine component. In that context, it is possible for parameters to be varied during application in order to optimize the layer thickness.

The speed v of the device for arranging a coating is the speed with which the device moves relative to the surface of the substrate. The track offset is the spacing between the parallel tracks along which the device is guided, during arranging, over the surface of the substrate.

Preferably, the movement parameters speed v and track offset p of the device for arranging a coating are fixed for the method. That means that the speed and the track offset of the device for arranging a coating are not changed during application of a spray spot of which the volume is to be determined. Of course, the movement parameters v and p of the device for arranging a coating can be changed between different application procedures, in order to find an optimum for these parameters. In relation to the coating, the terms arranging and applying are used synonymously.

In the method according to embodiments of the invention, the volume of the applied spray spot is preferably determined by tactile profilometry. This advantageously allows the three-dimensional structure—and from that the volume—of the spray spot to be determined. It is also preferred that the volume of the applied spray spot is determined by optical profilometry.

It is further preferred if, in the method according to embodiments of the invention, the volume of the applied spray spot is determined by an optical 3-D scanning technique. In that context, it is particularly preferred if the 3-D scanning technique performed is a structured light scan.

A second aspect of embodiments of the invention relates to an arrangement for carrying out a method for determining the thickness of a coating which is applied to a substrate, comprising:

a device for arranging a coating,
a device for determining the volume of a spray spot applied by the device for arranging a coating,
a control device, which is designed to calculate the complete layer thickness of the coating on the basis of the determined volume of the spray spot.

Particularly preferably, the device for arranging a coating is a spray gun.

The advantages of the arrangement according to embodiments of the invention correspond to those of the method according to embodiments of the invention.

BRIEF DESCRIPTION

Some of the embodiments will be described in detail, with reference to the following figures, wherein like designations denote like members, wherein.

DETAILED DESCRIPTION

Figure 1:
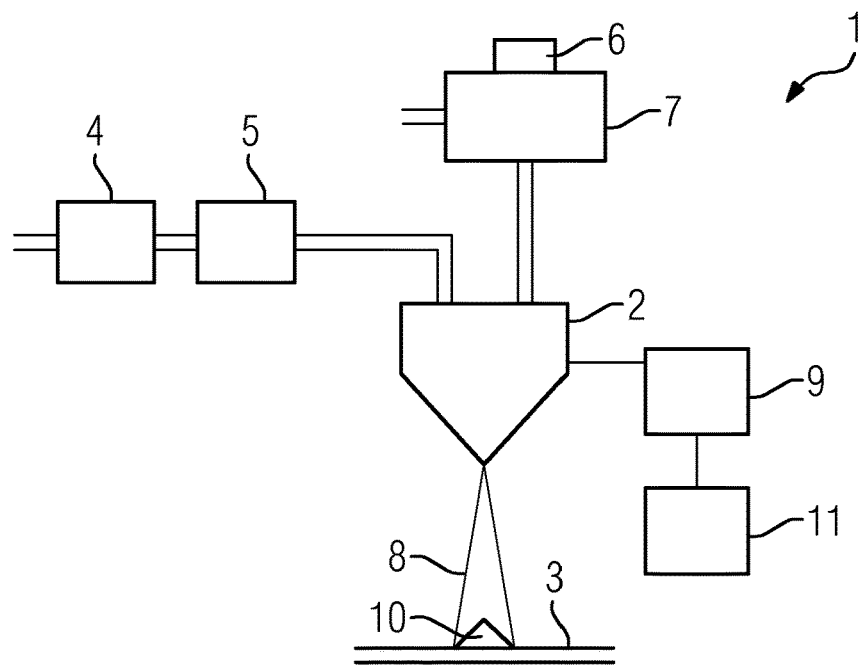
FIG. 1 shows an arrangement for carrying out a method for predetermining the thickness of a coating, in accordance with embodiments of the present invention.

One embodiment of an arrangement 1 according to embodiments of the invention is depicted in FIG. 1. The arrangement 1 comprises a device 2 for arranging a coating, which device is in the form of a spray gun 2. The spray gun is ideally used in a cold spray process for spraying particles in a gas stream onto the surface of a substrate 3. To that end, the spray gun 2 is connected to a high-pressure gas container 4 for providing high-pressure gas, a gas heater 5 for heating the gas, a material container 6 and a heater 7 for a powdered material 8.

The device 2 for arranging a coating may be of a different design, depending on the type of application. Other embodiments of the device 2 for arranging a coating are possible depending on the form of the device, for example a plasma nozzle in combination with a liquid or powder injector for suspension plasma spraying, or a flame tube for flame spraying, in particular powder flame spraying.

Figure 2:
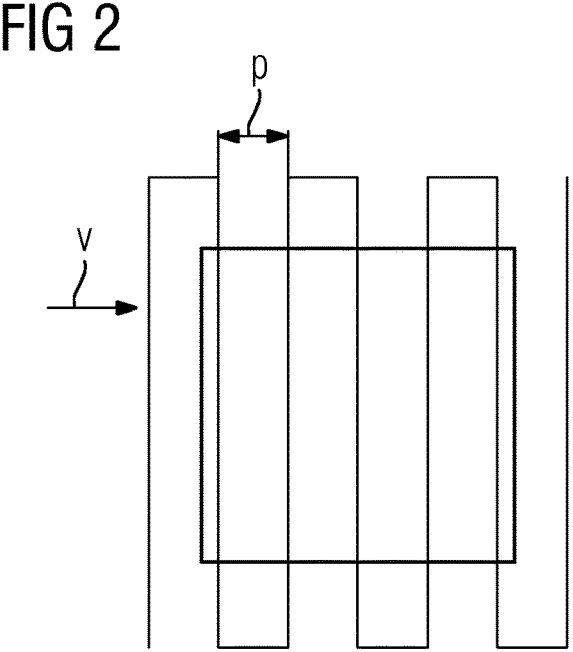
FIG. 2 is a schematic depiction of a path followed by the device for arranging a complete coating during coating, relative to the substrate, in accordance with embodiments of the present invention.

The spray gun 2 is designed such that, during application of the coating material 8, it is able to move relative to the surface of the substrate that is to be coated. In that context, the spray gun 2 is guided in parallel tracks over the surface of the substrate to be coated, as depicted in FIG. 2.

The substrate 3 is an iron-based or nickel-based metallic alloy, ideally a metallic superalloy, such as are used for temperature-resistant components of gas turbines. The coating material is ideally a pulverized ceramic material, such as is typically used for thermal barrier coatings. It is however also possible to apply a metallic alloy as the coating, for example of the type MCrAlY.

Figure 3:
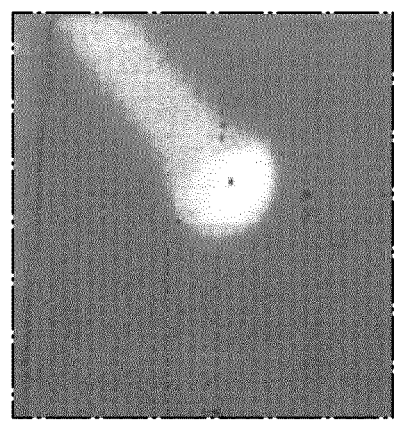
FIG. 3 is a photographic depiction of a spray spot of a coating material being sprayed, in accordance with embodiments of the present invention.

The spray gun 2 is connected to a control device 9. The control device 9 is designed to calculate the thickness of a spray spot 10 applied to the surface of the substrate 3, on the basis of the determined volume. FIG. 3 depicts the spray spot 10 applied to the surface of the substrate 3, during application. To that end, the control device 8 is further connected to a device 11 for determining the volume of the spray spot 10 applied by the device for arranging a coating 2. The device 11 can be a profilometer which operates either tactilely and examines the spray spot 10 by touch, for example using a diamond needle, or operates optically, for example using confocal techniques or laser profilometry or white light profilometry are determined contactlessly by optical profilometry. Alternatively, the device 11 can also be a device for three-dimensional scanning, which is in particular a structured light sensor. The control device 9 is designed both to output control commands to the device 11 and also to receive and further process data from the device 11.

Figure 4:
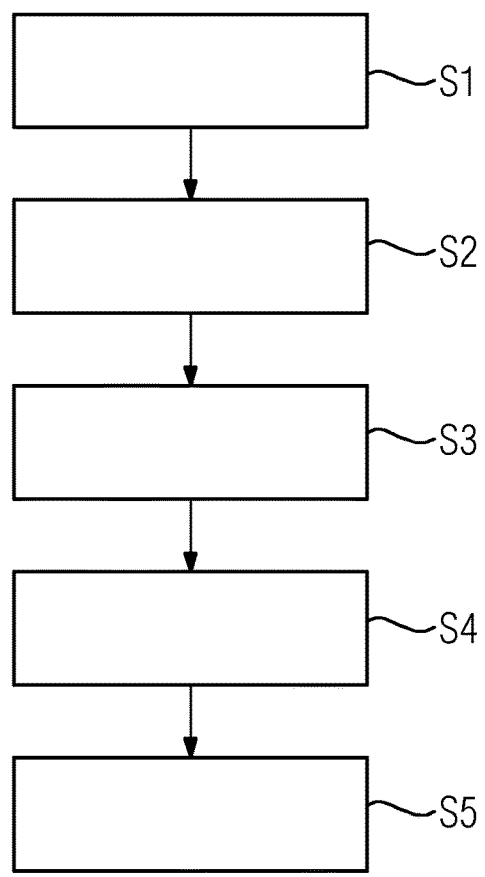
FIG. 4 is a flow chart of a method for predetermining the thickness of a coating, in accordance with embodiments of the present invention.

In a method according to the embodiment shown in FIG. 4, a first step S1 involves preparing a substrate 3 with a surface. The substrate 3 is preferably a flat metallic plate. A second step S2 involves providing a device 2 for arranging a coating on the substrate. Depending on the desired form of the coating, the device 2 provided is a spray gun as in FIG. 1 or alternatively a flame tube or a plasma nozzle. A third step S3 involves arranging a coating material, by applying the material from the device 2 on the surface of the substrate. This produces a spray spot of the deposited material on the surface of the substrate. Step S3 is carried out in a fixed time span.

A fourth step S4 involves determining the volume of an applied spray spot applied in a fixed time span, for example by tactile profilometry, wherein the three-dimensional structure of the applied spray spot is detected using a device 11, in particular a profilometer through examining by touch using a needle, and the identified structure is used to determine the volume of the applied spray spot. Alternatively, the volume of the applied spray spot can be determined contactlessly by optical profilometry. In another alternative embodiment, the volume of the sprayed spray spot can be determined in the method according to embodiments of the invention by an optical 3-D scanning technique. The 3-D scanning technique performed can be a structured light scan using blue or white light.

A fifth step S5 involves predetermining the thickness of a coating that is to be applied, on the basis of the determined volume of the applied spray spot. In that context, the value of the determined volume is plugged into the equation $$h_{layer} = 1/(v*p) * \Delta V_{spot}/\Delta t$$

where $h_{layer}$ is the thickness of the complete coating, v is the speed of the device for arranging a coating, p is the track offset, $\Delta V_{spot}$ is the determined volume of the applied spray spot, and $\Delta t$ is the time span fixed for the arranging. In that context, the values of the determined volume are transmitted to the control device which carries out the requisite calculation operation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for spraying a coating material onto a substrate, the method comprising:
   spraying, by a spray gun connected to a gas container and a gas heater, a spot of coating material onto only a portion of the substrate, in a fixed time span, wherein, during the spraying, the spray gun moves at a speed, v, relative to a surface of the substrate, along parallel tracks having a track offset, p, that guides the spray gun during the spraying;
   detecting, by a device, a volume of the spot applied to the portion of the substrate;

calculating, by a controller coupled to the spray gun and the device, a layer thickness of a complete coating that is to be later applied to the substrate by the spray gun, based on the volume of the spot as detected by the device, wherein the layer thickness is determined by the equation:

$$h_{layer} = 1/(v*p) * \Delta V_{spot}/\Delta t$$

where $h_{layer}$ is the layer thickness, v is the speed, p is the track offset defining a spacing between the parallel tracks, $\Delta V_{spot}$ is the volume of the spot, and $\Delta t$ is the fixed time span; and in response to the calculating the layer thickness by the control device, applying, by the spray gun, the complete coating of coating material to the substrate at the layer thickness, wherein, during the applying the complete coating of coating material at the layer thickness, the spray gun moves at the speed, v, along parallel tracks having the track offset, p.

2. The method as claimed in claim 1, wherein the substrate is a test substrate.

3. The method as claimed in claim 1, wherein the substrate is a gas turbine component.

4. The method as claimed in claim 1, wherein the volume of the applied spray spot is determined by tactile profilometry.

5. The method as claimed in claim 1, wherein the volume of the applied spray spot is determined by optical profilometry.

6. The method as claimed in claim 1, wherein the volume of the applied spray spot is determined by an optical 3-D scanning technique.

7. The method as claimed in claim 6, wherein the optical 3-D scanning technique performed is a structured light scan.

* * * * *